United States Patent
Farry et al.

(10) Patent No.: US 10,255,604 B1
(45) Date of Patent: *Apr. 9, 2019

(54) SYSTEM AND METHOD FOR FACILITATING ACCESS OF POSTAL SERVICES OF AN ACCOUNT BY ANOTHER ACCOUNT

(71) Applicant: PSI SYSTEMS, INC., Palo Alto, CA (US)

(72) Inventors: Patrick Sean Farry, Santa Clara, CA (US); Senthilvel Saravanan, Milpitas, CA (US); Jae Min Ma, San Jose, CA (US)

(73) Assignee: PSI SYSTEMS, INC., Palo Alto, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 14/215,666

(22) Filed: Mar. 17, 2014

Related U.S. Application Data

(60) Provisional application No. 61/799,346, filed on Mar. 15, 2013.

(51) Int. Cl.
*G06Q 20/00* (2012.01)
*G06Q 30/00* (2012.01)

(52) U.S. Cl.
CPC ............ *G06Q 30/00* (2013.01); *G06Q 20/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,864,618 A | * | 9/1989 | Wright | G06K 7/0034 340/5.8 |
| 4,958,291 A | * | 9/1990 | Mamone | G06F 21/60 235/379 |
| 5,111,030 A | * | 5/1992 | Brasington | G07B 17/00314 235/375 |
| 5,717,596 A | * | 2/1998 | Bernard | G06Q 30/04 705/30 |

(Continued)

FOREIGN PATENT DOCUMENTS

EP  2202694 A1 * 6/2010 ....... G07B 17/00508

OTHER PUBLICATIONS

Non-Final Office Action dated Sep. 8, 2016 in corresponding U.S. Appl. No. 14/215,611 (12 pages).

*Primary Examiner* — Daniel I Walsh
(74) *Attorney, Agent, or Firm* — Pillsbury Winthrop Shaw Pittman LLP

(57) ABSTRACT

An approach for facilitating access of postal services of an account by another account is disclosed. In some implementations, a request to authorize access for a first account to one or more postal services of a second account may be received. Responsive to authorization from the second account, the access to the one or more postal services of the second account may be enabled for the first account. A request initiated via the first account to execute a postal transaction associated with the one or more postal services of the second account may be received. Execution of the postal transaction may be initiated. Storage of a record related to the postal transaction in association with the second account may be initiated.

19 Claims, 9 Drawing Sheets

(56) References Cited

U.S. PATENT DOCUMENTS

| | | | | |
|---|---|---|---|---|
| 6,148,292 | A * | 11/2000 | Reisinger | G07B 17/0008 705/30 |
| 6,567,794 | B1 * | 5/2003 | Cordery | G06Q 20/02 705/401 |
| 7,113,928 | B1 * | 9/2006 | L'Hote | G06Q 30/018 705/317 |
| 7,490,065 | B1 * | 2/2009 | Ogg | G06Q 20/382 705/50 |
| 7,739,205 | B1 * | 6/2010 | Reisinger | G07B 17/00314 705/409 |
| 7,784,090 | B2 * | 8/2010 | Lord | G06Q 20/382 705/401 |
| 8,046,823 | B1 * | 10/2011 | Begen | G06F 21/335 726/12 |
| 8,201,217 | B1 * | 6/2012 | Begen | H04L 63/0815 726/12 |
| 8,775,331 | B1 * | 7/2014 | Tsuie | G07B 17/00362 705/1.1 |
| 9,818,122 | B1 * | 11/2017 | Farry | G06Q 30/00 |
| 2001/0032881 | A1 * | 10/2001 | Wells | G07B 17/00435 235/385 |
| 2001/0042052 | A1 * | 11/2001 | Leon | B41J 11/42 705/401 |
| 2002/0077847 | A1 * | 6/2002 | Thiel | G06Q 10/08 705/39 |
| 2002/0133472 | A1 * | 9/2002 | Stepno | G01G 19/005 705/407 |
| 2003/0055794 | A1 * | 3/2003 | Johnson | G07B 17/00435 705/403 |
| 2003/0074333 | A1 * | 4/2003 | Foth | G06Q 20/02 705/401 |
| 2003/0120606 | A1 * | 6/2003 | Gravell | G06Q 20/02 705/60 |
| 2004/0024827 | A1 * | 2/2004 | Yoshimura | H04L 29/12009 709/206 |
| 2004/0143650 | A1 * | 7/2004 | Wollowitz | H04L 29/06 709/219 |
| 2004/0254893 | A1 * | 12/2004 | Tsuei | G06Q 10/08 705/74 |
| 2004/0260615 | A1 * | 12/2004 | Phillips | G06Q 10/08 705/26.44 |
| 2005/0065892 | A1 * | 3/2005 | Ryan, Jr. | H04L 9/3247 705/62 |
| 2005/0071244 | A1 * | 3/2005 | Phillips | G06Q 10/08 705/26.41 |
| 2005/0097173 | A1 * | 5/2005 | Johns | G06F 17/3028 709/206 |
| 2005/0119786 | A1 * | 6/2005 | Kadaba | B07C 3/00 700/224 |
| 2005/0228680 | A1 * | 10/2005 | Malik | G06F 21/33 709/206 |
| 2005/0278263 | A1 * | 12/2005 | Hollander | G07B 17/00435 705/402 |
| 2006/0015469 | A1 * | 1/2006 | Whitehouse | G06Q 10/0831 705/410 |
| 2006/0149690 | A1 * | 7/2006 | Lau | G07B 17/0008 705/403 |
| 2006/0167952 | A1 * | 7/2006 | Grear | G06Q 10/10 |
| 2008/0043958 | A1 * | 2/2008 | May | H04M 1/72563 379/201.02 |
| 2008/0066099 | A1 * | 3/2008 | Brodersen | G06F 17/30038 725/35 |
| 2008/0110977 | A1 * | 5/2008 | Bonalle | G06K 19/06187 235/380 |
| 2008/0120386 | A1 * | 5/2008 | Piccinini | G06Q 10/107 709/206 |
| 2008/0228615 | A1 * | 9/2008 | Scipioni | G06Q 20/04 705/35 |
| 2010/0169241 | A1 * | 7/2010 | Schoonmaker | G07B 17/00508 705/408 |
| 2010/0235267 | A1 * | 9/2010 | Brookner | G06Q 10/10 705/30 |
| 2010/0235303 | A1 * | 9/2010 | Lynch | G06Q 30/02 705/402 |
| 2010/0318923 | A1 * | 12/2010 | Kim | G06Q 10/107 715/752 |
| 2011/0010289 | A1 * | 1/2011 | Kranzley | G06Q 20/10 705/39 |
| 2011/0166994 | A1 * | 7/2011 | Ross | G06Q 20/102 705/40 |
| 2014/0244536 | A1 * | 8/2014 | Far-Hadian | G06Q 50/32 705/330 |
| 2017/0168868 | A1 * | 6/2017 | Cristiani | G06F 9/48 |

\* cited by examiner

Primary Account Authorizes Secondary/Linked Account

FIG. 6  Secondary/Linked Account Gets Primary Account Token

A Broker's Customer uses Broker's Postal Meter to Buy and Print Postage

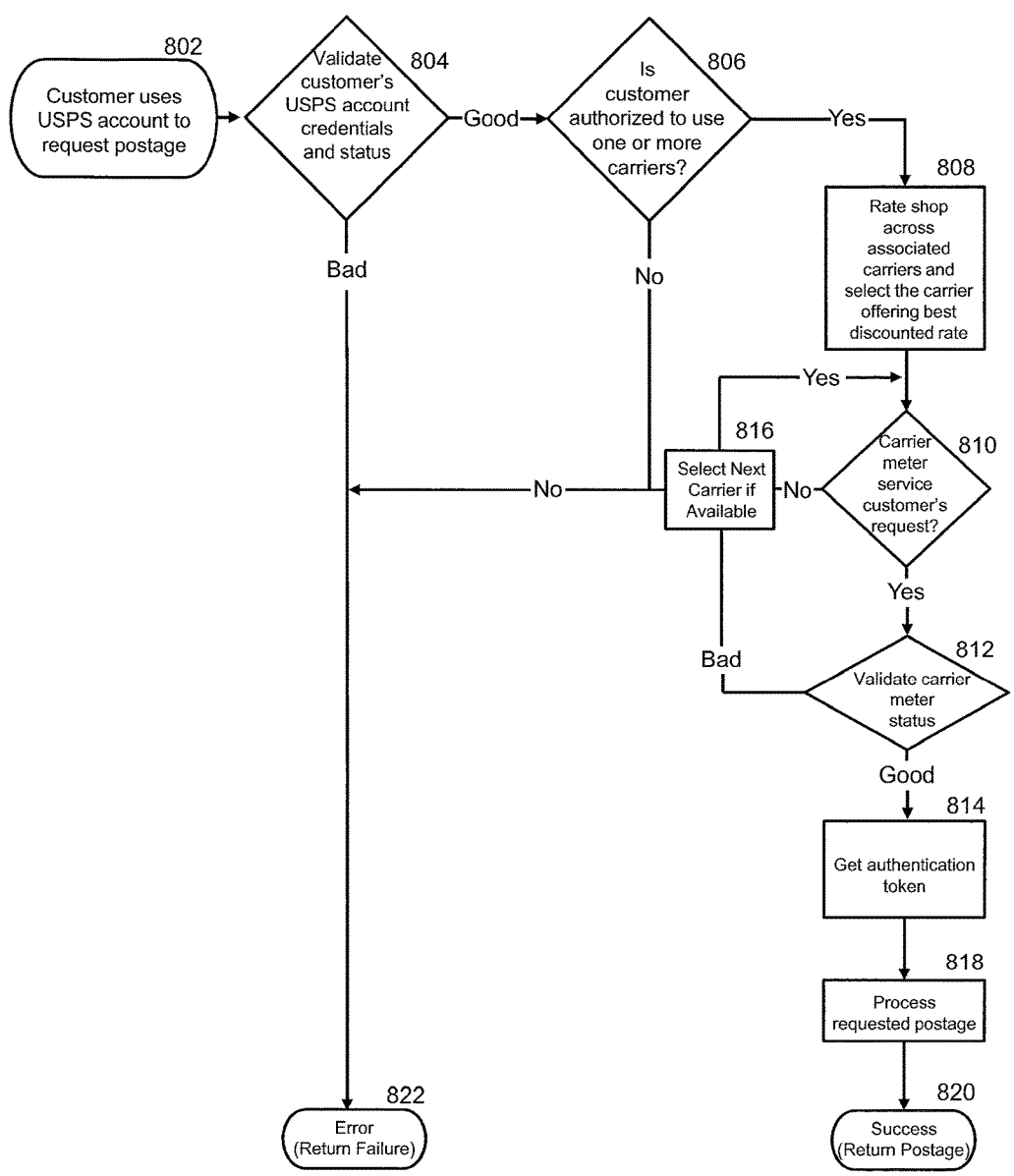

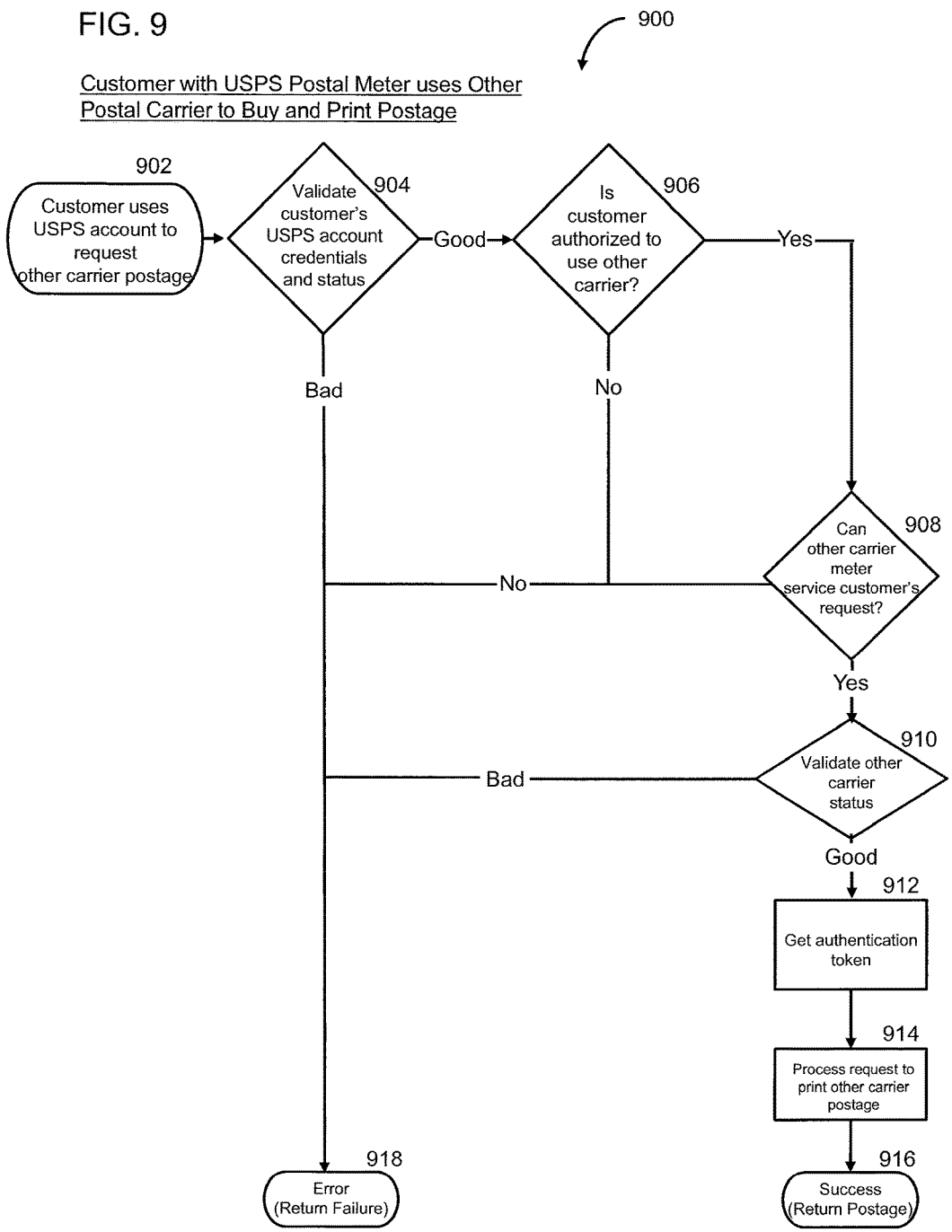

SYSTEM AND METHOD FOR FACILITATING ACCESS OF POSTAL SERVICES OF AN ACCOUNT BY ANOTHER ACCOUNT

CROSS-REFERENCE TO RELATED APPLICATIONS

This application claims priority to: U.S. Provisional Patent Application Ser. No. 61/799,346, filed on Mar. 15, 2013, entitled, "Sharing of Postal Services," which is hereby incorporated by reference herein in its entirety. This application is additionally related to U.S. patent application Ser. No. 14/215,611, filed Mar. 17, 2014, entitled, "System and Method for Secure Sharing of Postal Services," which is additionally hereby incorporated by reference herein in its entirety.

FIELD OF THE DISCLOSURE

The present disclosure relates generally to sharing of postal services and, in particular, to facilitating access of postal services of an account by another account.

BACKGROUND

Postal carriers, such as the United States Postal Service (USPS), Canada Post, French La Poste (or La Poste), DHL, FedEx, UPS, etc., offer their customers virtual access to their postal services. For example, an account holder of a particular postal carrier account may generate postal indicia using the account's postage meter and charge the cost of the postal indicia to the account. An account holder may also wish to authorize other parties to access his account's postal services (e.g., use of the account holder's postage meter, services with the account holder's bulk price, etc.).

Due to strict government postal regulations (e.g., related to postage meters), a postage meter (e.g., USPS postage meter, La Poste postage meter, etc.) may be limited to a single "owner." The owner of a postage meter may, for example, be an account holder of an account associated with the postage meter. Traditionally, because of the limitations, an account holder would share his account credentials (e.g., username and password) to another party to allow the other party to log into the account holder's account to access the account's postage meter (or other postal services). However, sharing the account credentials to another party may result in a number of issues for the account holder, including access to the account by unauthorized parties using the shared account credentials, lack of accountability for charges to the account, or other issues.

SUMMARY

One aspect of the disclosure relates to methods, apparatuses, and/or systems for facilitating sharing of postal services (e.g., virtual postal services). As described in further details below, in certain implementations, an account holder may share his account's postal services with other parties without having to share his password or other credentials to the other parties, for example, to prevent unauthorized parties from knowing the account holder's password or other credentials.

In some implementations, an account holder of an account with a postage meter (or other postal services) may authorize other accounts to access the account's postage meter (or other postal services). The authorization may, for example, be performed in a secure manner to ensure that the owner of a postage meter (e.g., the account holder) actually granted the authorization to use the postage meter.

As an example, in one implementation, a method may comprise: receiving a request to authorize access for a first account to one or more postal services of a second account, wherein the authorization request indicates a first identifier associated with the first account and a second identifier associated with the second account; generating a message based on the first identifier and the second identifier; providing the generated message to a cryptographic platform; and receiving, from the cryptographic platform, an integrity code associated with the first account and the second account in response to providing the generated message, wherein the integrity code is configured to enable the first account to access the one or more postal services of the second account.

In another implementation, a system may comprise one or more physical processors programmed with one or more computer program instructions which, when executed, cause the system to: receive a request to authorize access for a first account to one or more postal services of a second account, wherein the authorization request indicates a first identifier associated with the first account and a second identifier associated with the second account; generate a message based on the first identifier and the second identifier; provide the generated message to a cryptographic platform; and receive, from the cryptographic platform, an integrity code associated with the first account and the second account in response to providing the generated message, wherein the integrity code is configured to enable the first account to access the one or more postal services of the second account.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The present disclosure is illustrated by way of example, and not by way of limitation, in the figures of the accompanying drawing and in which like reference numerals refer to similar elements.

FIG. 8 illustrates a flowchart of a process for using a postal carrier account to print postage of other postal carriers, in accordance with one or more implementations.

FIG. 9 illustrates another flowchart of another process for using a postal carrier account to print postage of other postal carriers, in accordance with one or more implementations.

DETAILED DESCRIPTION

Examples for facilitating sharing of postal services are disclosed. In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention.

Figure 1:
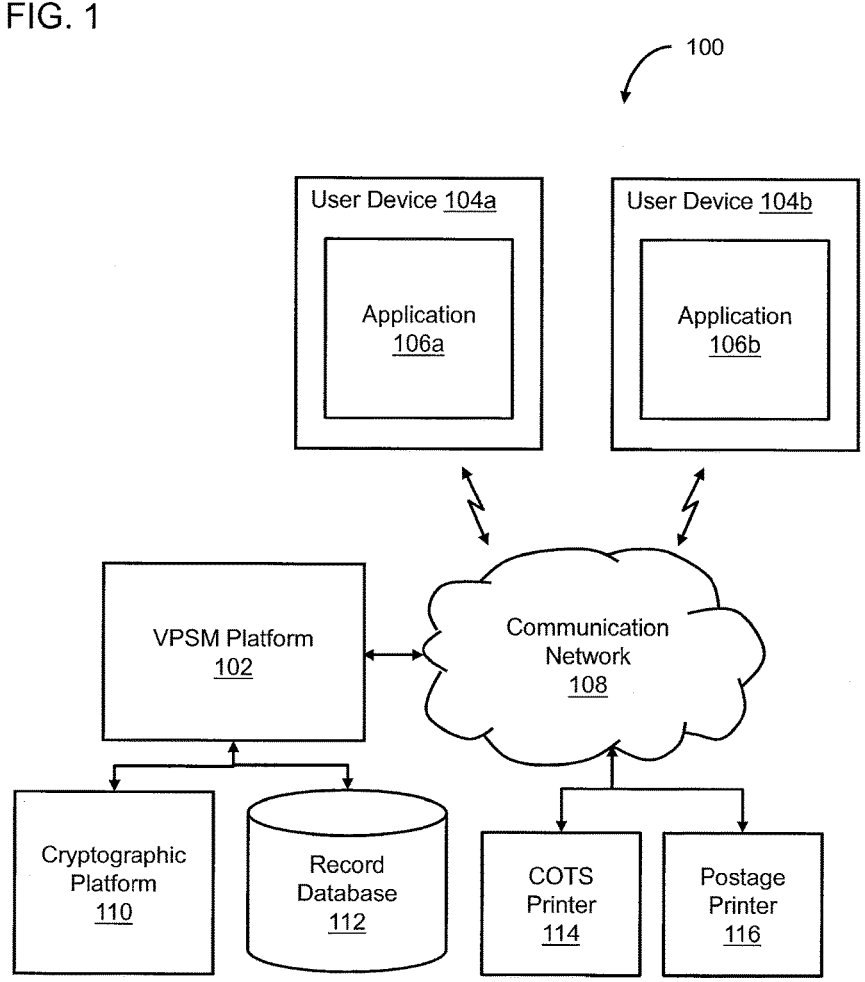
FIG. 1 illustrates a diagram of a system capable of facilitating sharing of postal services, in accordance with one or more implementations.

FIG. 1 illustrates a diagram of a system 100 capable of facilitating sharing of postal services, in accordance with one or more implementations. As noted, there are a number of situations in which an account holder may wish to authorize other parties or accounts to access postal services of his account. For example, a broker (or other agent) of a postal carrier may allow their customers to generate postage indicia using the broker's postage meter, and an organization may allow its employees to generate postage indicia using the organization's postage meter. Moreover, the broker or organization may have accounts with multiple postal carriers and may want to use one account to access the postal services of all of its postal carrier accounts to improve the workflow and management of postal-related tasks. As noted, it is important that such authorization is performed in a secure way, for instance, to ensure that the owner of a postage meter actually granted the authorization to use the postage meter. It should be noted that, although various entities (e.g., broker, reseller, consolidator, partner, organization, etc.) are used in one or more use cases, scenarios, or other examples to describe one or more implementations, it is understood that the implementations are not limited to any specific entity. The various entities used in the use cases, scenarios, or other examples may, for instance, be replaced with one another or other entities in other use cases, scenarios, etc.

According to one aspect of the invention, the system 100 may address the above issues, for example, by utilizing a cryptographic device (e.g., having a cryptographic platform), such as a postal cryptographic coprocessor (PCC) or other cryptographic device, to facilitate security and integrity for authorization of other users or accounts to use a postage meter or other services of an account that has access to the postage meter or other services. The system 100 may, for instance, enable an owner of an account to grant other users or other accounts access to the owner's account, to specify the time period in which the access will remain valid, to indicate the actions that the other users or other accounts may perform on the owner's account, to revoke the granted access at any time, or provide other benefits.

As shown in FIG. 1, the system 100 may include a virtual postal service management (VPSM) platform 102, user devices 104 (e.g., user devices 104a and 104b) that include application 106 (e.g., applications 106a and 106b), a communication network 108, a cryptographic platform 110, a record database 112, a common-off-the-shelf (COTS) printer 114 (e.g., networked COTS printer), a specialized postage printer 116 (e.g., a networked postage printer having an integrated printer, scale and letter/label feeder, etc.), and/or other components.

The VPSM platform 102 may interact with various components of the system 100 to facilitate sharing of postal services. In one implementation, the VPSM platform 102 may handle requests to access postal services of an account or to authorize access for another account to the postal services of the account. By way of example, a first user may be an owner of a first account and the user device 104a, and a second user may be an owner of a second account and the user device 104b.

In one use case, the second user may wish to share one or more postal services of the second account with the first user such that the first user may access the one or more postal services of the second account via the first user's own account (e.g., the first account). As such, the second user may utilize the user device 104b to login into the second account and initiate a request to authorize the access for the first account to access the one or more postal services of the second account (e.g., use of the second account's postage meter, services with the second account's bulk price, etc.). The request to authorize the access for the first account may be received by the VPSM platform 102. The authorization request may include a first identifier associated with the first account, a second identifier associated with the second account, and/or other information.

The VPSM platform 102 may generate a message based on the first identifier, the second identifier, and/or other information, and then provide the generated message to the cryptographic device 110. In one implementation, the authorization request may further indicate a scope of the access for the first account to the one or more postal services of the second account. For example, the second user may indicate the scope of the access by selecting which postal services of the second account that the first account may use, a maximum amount that the first account may charge to the second account, etc. In another implementation, the VPSM platform 102 may generate the message (that is provided to the cryptographic platform 110) based on the first identifier, the second identifier, information indicating the scope, and/or other information.

In response to providing the generated message, the VPSM platform 102 may receive, from the cryptographic platform 110, an integrity code (associated with the first account, the second account, etc.) that is configured to enable the first account to access the one or more postal services of the second account. The integrity code may, for instance, include a message authentication code (MAC), a public key signature, or other integrity codes.

For example, the cryptographic platform 110 may generate the integrity code based on the generated message and a key (e.g., a key that is known only by the cryptographic platform 110). The VPSM platform 102 may then store the first identifier, the second identifier, and the integrity code in the record database 112, for instance, such that the first identifier, the second identifier, and the integrity code are associated with one another in the record database 112. In some implementations, the VPSM platform 102 may store the first identifier, the second identifier, the integrity code, and information indicating the scope of the access (e.g., a scope identifier that indicates the actions the first account may perform on the second account) in the record database 112 such that the first identifier, the second identifier, the integrity code, and the information indicating the scope are associated with one another in the record database 112. For example, a signed authorization record that includes the first identifier, the second identifier, the integrity code, and information indicating the scope of the access may be stored in the record database 112. In one implementation, the signed authorization record may further include the data/time that the authorization record was created, the period of validity of the relationship (e.g., the trust relationship) between the first and second accounts, and/or other information.

In some implementations, a request may be initiated by the first account (or the first user of the first account via the user device 104*a*) to access the one or more services of the second account. The VPSM platform 102 may receive the access request which may include the first identifier, the second identifier, and/or other information. The VPSM platform 102 may retrieve the integrity code from a database based on the access request. For example, the integrity code may be retrieved using the first identifier, the second identifier, and/or other information. The VPSM platform 102 may then utilize the cryptographic platform 110 to determine whether the integrity code is valid. In addition, the VPSM platform 102 may determine whether the second account is active.

In one use case, for instance, a signed authorization record that includes the integrity code and the generated message (that was provided to the cryptographic platform 110 to obtain the integrity code) may be stored (e.g., in the record database 112) to indicate that the first account has authorization to access to the one or more postal services of the second account and to indicate the scope of that access. Upon receiving the access request from the first account, the VPSM platform 102 may identify and retrieve the signed authorization record by the first identifier and/or the second identifier, thereby retrieving the generated message and the integrity code. To have the cryptographic platform 110 validate the integrity code, the VPSM platform 102 may provide the generated message (used to originally generate the integrity code) to the cryptographic platform 110. If, for instance, the cryptographic platform returns an integrity code that is the same as the integrity code stored as part of the signed authorization record, the VPSM platform 102 may determine that the integrity code is valid.

In response to determining that the integrity code is valid (e.g., by using the cryptographic platform 110) and that the second account is active, the VPSM platform 102 may generate a token usable by the first account to access the one or more postal services of the second account. By way of example, if the first user initiated the access request from the user device 104*a* (e.g., having the application 106*a*), the VPSM platform 102 may provide the token to the application 106*a* (e.g., via the user device 104*a*, via one or more intermediary devices, etc.) so that the first user may continue to access the one or more postal services of the second account via the application 106*b*. The application 106*b* may cache account information associated with the first account, the token, and an expiration date/time of the token. As such, the application 106*b* may reduce the time necessary for authentication by avoiding the need to regenerate the token for each transaction, to obtain the account information, etc.

The token may be an authentication token that includes the signed authorization record (e.g., having the first identifier, the second identifier, the integrity code, the scope of the access, and/or other information). When the token is provided to the application 106*a*, it may be provided in an encrypted form (e.g., using AES256 or other encryption scheme). The application 106*a* may, for instance, provide the encrypted token to the VPSM platform 102 each time that the first user needs to access a postage meter or other postal service of the second account. The VPSM platform 102 may thus decrypt the token (e.g., using the cryptographic platform 110) to obtain the signed authorization record that is included in the token to determine whether the first account is authorized to access the postage meter or other postal service of the second account. In this way, the token reduces the time needed to authorize the first account to access the postal services of the second account, for instance, because the VPSM platform 102 does not need to retrieve the signed authorization record from the record database 112.

In one implementation, the authentication token may be alternative credentials that are sent for every access request to authenticate the parties. Compared with session tokens which may be generated after authentication to preserve a user's session/state on a server for the duration of a transaction that may require many calls from a client to the server, there may be no state associated with the alternative credentials (e.g., the credentials may be sent for every access request).

It should be noted that, in some implementations, an authentication token may not be used by the first account to access the postal services of the second account. For example, in one use case, when the first account initiate a request to access the postal services of the second account, a lookup may be performed on the record database 112 to retrieve the signed authorization record associated with the first account and the second account. As noted, the signed authorization record may include a message (e.g., generated based on a first identifier of the first account, a second identifier of the second account, the scope of the access, and/or other information) and the integrity code associated with the first account and the second account. The message may be provided to the cryptographic platform, which may return an integrity code that is checked against the integrity code of the signed authorization record. As such, without the authentication token, each transaction by the first account on the second account may require a lookup in the record database 112 for the signed authorization record. Thus, implementations that do not utilize the authentication tokens may result in longer delays, for instance, due to the time needed to retrieve the signed authorization record from the record database 112 for each transaction.

In certain implementations, tokens to access a particular account may be generated based on one or more passwords (e.g., passcodes, pass phrases, secret words, etc.) associated with that account. Thus, in one implementation, the VPSM platform 102 may determine a password (or its corresponding hash) associated with the second account and generate the token based on the determined password (or its corresponding hash). The password may, for instance, include one or more letters, numbers, spaces, or special characters. In one use case, the password used to generate the token may not necessarily be a password that a user of the second account utilizes to log into the second account. As an example, the password used to generate the token may be a password chosen (e.g., by the user of the second account)

specifically for the generation of tokens useable to access postal services of the second account.

In various implementations, the tokens that are generated based on the passwords associated with the accounts to which the tokens grant access may become invalid when the passwords are later modified (e.g., automatic password modification, user-initiated modifications, etc.). In one implementation, for instance, the VPSM platform 102 may facilitate modifying of the password by a user of the second account. When an attempt to access the one or more postal services of the second account is based on the token generated prior to the modifying of the password, the VPSM platform 102 may determine that the token is an invalid token and deny the attempted access.

In some implementations, the second account may be a primary account for accessing one or more services of a postal carrier (e.g., USPS, Canada Post, La Poste, DHL, FedEx, UPS, etc.). For example, the one or more services of the postal carrier may include the one or more postal services of the second account. The first account may be associated as a secondary account to the primary account of the postal carrier based on the authorization request. In one scenario, for instance, the first user may utilize the first account to use the second account's postage meter and charge postage costs to the second account. Some examples include: (1) the first account being a customer account of a broker (or other entity) while the second account may be the broker's primary account with a particular postal carrier; (2) the first account being an employee's account associated with an employer while the second account may be the employer's primary account with a particular postal carrier; or (3) the first account being a third party account that may be linked to one or more primary accounts for one or more postal carriers such that the third party account may be utilized to access the postal services of each of those primary accounts (e.g., using a single account to access postal services of multiple primary accounts of multiple postal carriers).

In certain implementations, the first account may be a primary account for accessing one or more services of another postal carrier that is different from the postal carrier for which the second account is a primary account. As such, in one scenario, the first account may be a primary account with USPS, and the second account may be a primary account with La Poste. Nevertheless, once the two accounts are properly linked, the USPS primary account may be utilized to generate La Poste postage indicia (e.g., via the access to the La Poste primary account) and/or charge the postage costs to the La Poste primary account. It should be noted that, although various postal carriers (e.g., USPS, Canada Post, La Poste, DHL, FedEx, UPS, etc.) are used in one or more use cases, scenarios, or other examples to describe one or more implementations, it is understood that the implementations are not limited to any specific postal carrier. For example, it is understood that the first account, the second account, or other accounts may be accounts with any postal carrier.

The communication network 108 of system 100 may include one or more networks such as a data network, a wireless network, a telephony network, and/or other communication networks. It is contemplated that the data network may be any local area network (LAN), metropolitan area network (MAN), wide area network (WAN), a public data network (e.g., the Internet), short range wireless network, and/or any other suitable packet-switched network. The wireless network may, for example, be a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

The user devices 104 may be any type of mobile terminal, fixed terminal, and/or other device. For example, the user devices 104 may include a desktop computer, a notebook computer, a netbook computer, a tablet computer, a smartphone, a navigation device, an electronic book device, a gaming device, a point-of-sale (POS) device, an automated teller machine (ATM), and/or other user devices. In some implementations, the user devices 104 may be the accessories and peripherals of these devices. It is also contemplated that the user devices 104 may support any type of interface to the user (such as "wearable" circuitry, etc.).

Figure 2:
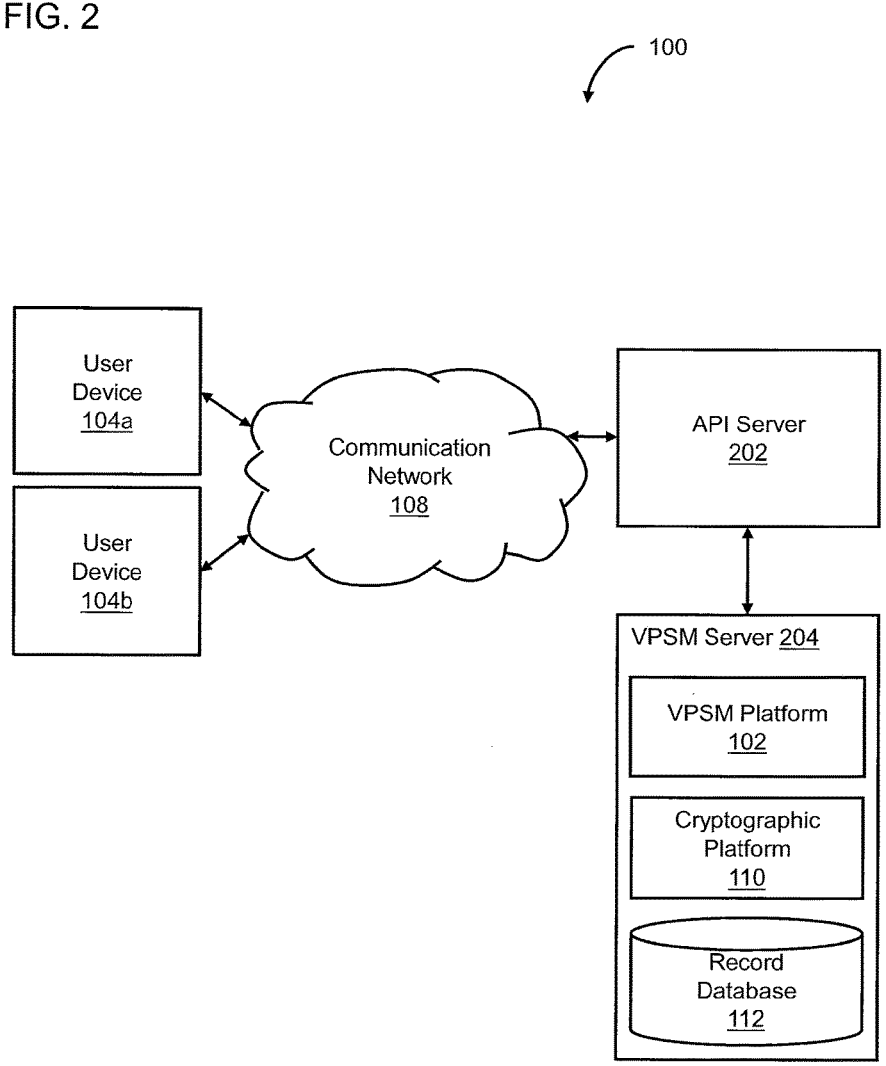
FIG. 2 illustrates another diagram of a system capable of facilitating sharing of postal services, in accordance with one or more implementations.

FIG. 2 illustrates another diagram of the system 100, in accordance with one or more implementations. As shown, in one implementation, the system 100 may further include an application programming interface (API) server 202 (e.g., front-end API server) along with a VPSM server 204 (e.g., backend API server) having the VPSM platform 102, the cryptographic platform 110, and the record database 112. By way of example, a primary account holder may utilize the user device 104*b* to initiate a request to authorize access to the primary account holder's postage meter for another user or account. The access request may be accepted by the API server 202, which may then route the access request to the VPSM server 204 for authorization. Using the VPSM platform 102, the VPSM server 204 may accept the access request and coordinate between the cryptographic platform 110 and the record database 112 to authorize the access for the other user or account via the approaches described herein. It is noted that, in some implementations, user devices 104 may interact directly with the VPSM server 204 (e.g., without the API server 202), interact with the VPSM server 204 through a networked API device, or otherwise interact with the VPSM server 204 through other techniques.

Figure 3:
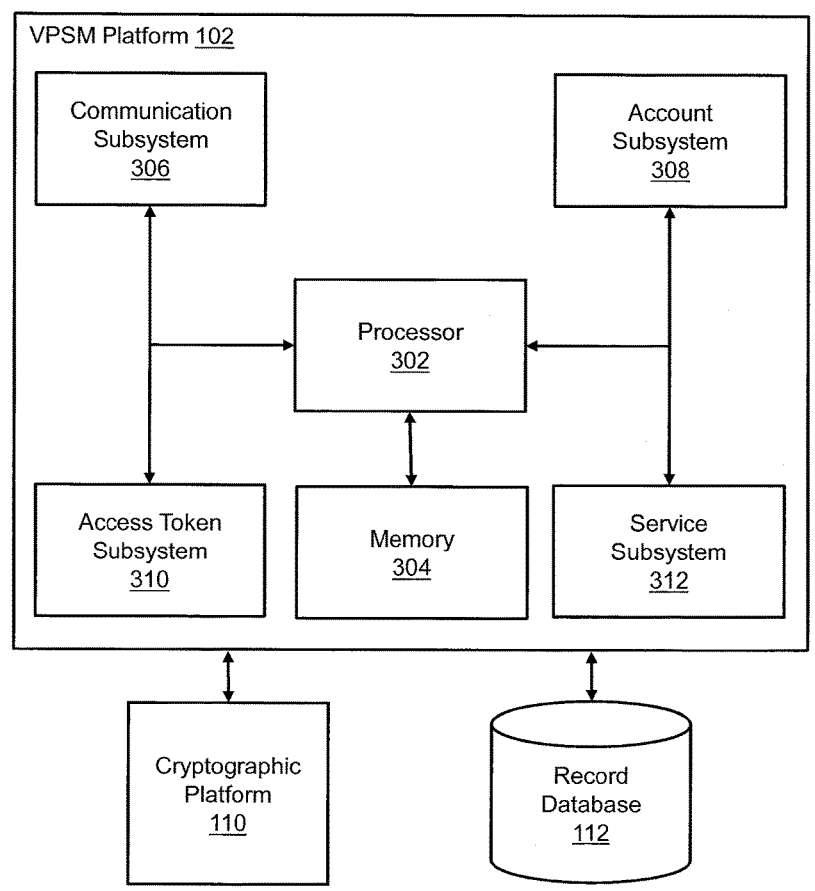
FIG. 3 illustrates a block diagram of the components of a virtual postal service management (VPSM) platform, in accordance with one or more implementations.

FIG. 3 illustrates a block diagram of the components of the VPSM platform 102, in accordance with one or more implementations. By way of example, the VPSM platform 102 may include one or more components for facilitating sharing of postal services. It is contemplated that the operations of these components may be combined in one or more components or performed by other components of equivalent functionality. In one implementation, the VPSM platform 102 may include a processor 302, memory 304, a communication subsystem 306, an account subsystem 308, an access token generation subsystem 310, a service subsystem 312, or other components.

The processor 302 may include one or more of a digital processor, an analog processor, a digital circuit designed to process information, an analog circuit designed to process information, a state machine, and/or other mechanisms for electronically processing information. Although the processor 302 is shown in FIG. 3 as a single entity, this is for illustrative purposes only. In some implementations, the processor 302 may include a plurality of processing units. These processing units may be physically located within the same device, or the processor 302 may represent processing functionality of a plurality of devices operating in coordination.

The processor 302 may execute at least one algorithm for executing operations of the VPSM platform 102 by working with one or more components of the VPSM platform 102. For example, in certain implementations, the processor 302 may work with the communication subsystem 306 to facilitate communication with other components of the VPSM platform 102, communication among the other components of the VPSM platform 102, or communication with devices external to the VPSM platform 102. In one use case, for instance, the communication subsystem 306 may be utilized to receive requests to authorize access for a secondary account to one or more postal services of a primary account, and to forward those requests to the appropriate components. As discussed, the access request may indicate the primary account identifier, the secondary account identifier, a scope of the access for the secondary account to the one or more postal services of the primary account, etc.

In some implementations, the account subsystem 308 may generate a message based on the primary account identifier, the secondary account identifier, and/or the scope information. The account subsystem 308 may then provide, to the cryptographic platform 110 (e.g., via the communication subsystem 306), the generated message. In response to providing the generated message, the account subsystem 308 may receive, from the cryptographic platform 110, an integrity code associated with the primary account and the secondary account. As discussed, the primary account identifier, the secondary account identifier, the integrity code, and/or information indicating the scope of the access may thereafter be stored by the account subsystem 308 in the record database 112 such that the primary account identifier, the secondary account identifier, the integrity code, and/or the information indicating the scope are associated with one another in the record database 112.

In various implementations, the access token generation subsystem 310 may generate tokens usable by secondary accounts to access postal services of primary accounts to which the secondary accounts are linked. By way of example, after initial setup results in an integrity code being stored in association with the primary account identifier and the secondary account identifier in the record database 112, the secondary account may initiate a request to access the one or more postal services of the primary account. As mentioned, the access request may indicate the primary account identifier and the secondary account identifier.

Upon receipt of the access request (e.g., via the communication subsystem 306), the account subsystem 308 may retrieve the integrity code based on the primary account identifier and/or the secondary account identifier indicated by the access request. If, for instance, the account subsystem 308 determines that the integrity code is valid and the primary account is active, the access token generation subsystem 310 may determine a password (or its corresponding hash) associated with the primary account. The access token generation subsystem 310 may then generate a token usable by the secondary account to access the one or more postal services of the primary account based on the determined password (or its corresponding hash).

In some implementations, the token may remain usable by the secondary account until the token expires (e.g., default expiration time, expiration time set by the primary account holder, etc.), the password associated with the primary account is modified, or one or more other triggers occur. For example, an encrypted form of the token may, for instance, be provided to the user device 104a associated with the secondary account so that the user of the secondary account may continue to access the one or more postal services of the primary account until one of the triggers causing the token to become invalid occurs. The user device 104a may, for instance, provide the encrypted token to the account subsystem 308 (or the service subsystem 312) which may thereafter utilize the cryptographic platform 110 to decrypt the token to determine whether the token is valid.

In certain implementations, the service subsystem 312 may provide the one or more postal services of the primary account to the secondary account when the secondary account has been properly authenticated using the token. For example, the service subsystem 312 may interact with the primary account's postage meter to generate postage indicia for the secondary account.

Figure 4:
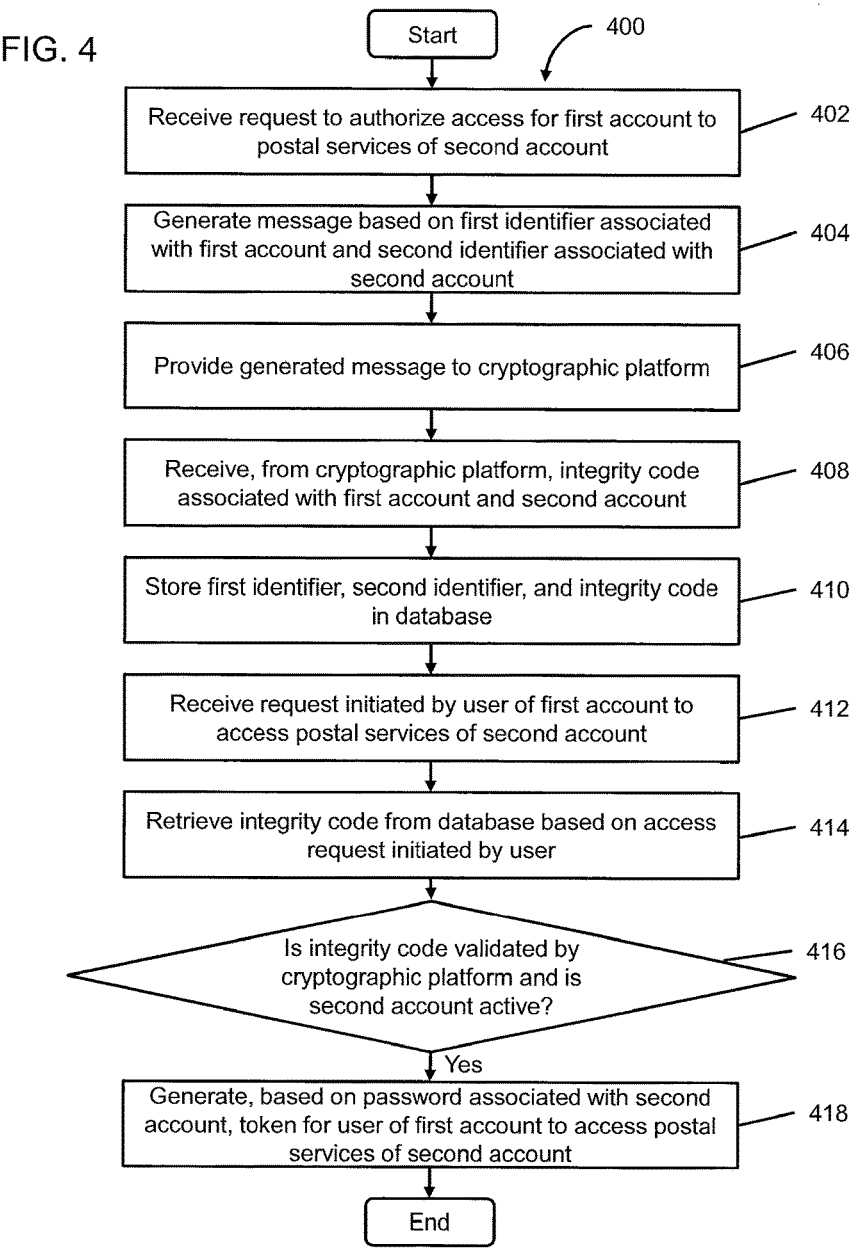
FIG. 4 illustrates a flowchart of a process for facilitating sharing of postal services, in accordance with one or more implementations.

FIG. 4 illustrates a flowchart of process 400 for facilitating sharing of postal services, in accordance with one or more implementations. The operations of process 400 presented below are intended to be illustrative. In some implementations, process 400 may be accomplished with one or more additional operations not described, and/or without one or more of the operations discussed. Additionally, the order in which the operations of process 400 are illustrated in FIG. 4 and described below is not intended to be limiting.

In certain implementations, process 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 400 in response to instructions stored electronically on an electronic storage medium. The one or more processing devices may include one or more devices configured through hardware, firmware, and/or software to be specifically designed for execution of one or more of the operations of process 400.

At operation 402, a request to authorize access for a first account to one or more postal services of a second account may be received by communication subsystem 306, in accordance with one or more implementations. The authorization request may indicate the first identifier, the second identifier, and/or other information. In some implementations, the second account may be a primary account for accessing one or more services of a postal carrier. The first account may be associated as a secondary account to the primary account of the postal carrier based on the authorization request. The one or more services of the postal carrier may include the one or more postal services of the second account. In various implementations, the first account may further be a primary account of another postal carrier that is different from the postal carrier for which the second account is a primary account. It will be appreciated that operation 402 may be performed by a communication subsystem that is the same as or similar to communication subsystem 306, in accordance with one or more implementations.

At operation 404, a message may be generated by account subsystem 308 based on the first identifier, the second identifier, and/or other information, in accordance with one or more implementations. In certain implementations, the authorization request may indicate the first identifier, the second identifier, and a scope of the access for the first account to the one or more postal services of the second account. In some implementations, the message may be generated based on the first identifier, the second identifier, and information indicating the scope. It will be appreciated that operation 404 may be performed by an account subsystem that is the same as or similar to account subsystem 308, in accordance with one or more implementations.

At operation 406, the generated message may be provided by account subsystem 308 to a cryptographic platform, in accordance with one or more implementations. The generated message may, for instance, be provided to the cryptographic platform in a request for an integrity code associated with the first account and the second account. The integrity code may include a message authentication code (MAC), a public key signature, or other integrity codes. It will be appreciated that operation 406 may be performed by an account subsystem that is the same as or similar to account subsystem 308, in accordance with one or more implementations.

At operation 408, the integrity code associated with the first account and the second account may be received by communication subsystem 306 from the cryptographic platform, in accordance with one or more implementations. As shown, in some implementations, the integrity code may be received in response to providing the generated message to the cryptographic platform. The integrity code may be configured to enable the first account to access the one or more postal services of the second account. It will be appreciated that operation 408 may be performed by a communication subsystem that is the same as or similar to communication subsystem 306, in accordance with one or more implementations.

At operation 410, the first identifier, second identifier, and the integrity code may be stored by account subsystem 308 in a database, in accordance with one or more implementations. The first identifier, the second identifier, and the integrity code may be stored such that the first identifier, second identifier, and the integrity code are associated with one another in the database. In some implementations, information indicating the scope of the access for the first account may also be stored such that the first identifier, second identifier, the integrity code, and the information indicating the scope are associated with one another in the database. It will be appreciated that operation 410 may be performed by an account subsystem that is the same as or similar to account subsystem 308, in accordance with one or more implementations.

At operation 412, a request initiated by the first account to access the one or more postal services of the second account may be received by communication subsystem 306, in accordance with one or more implementations. It will be appreciated that operation 412 may be performed by a communication subsystem that is the same as or similar to communication subsystem 306, in accordance with one or more implementations.

At operation 414, the integrity code may be retrieved by account subsystem 308 from the database based on the access requested initiated by the first account, in accordance with one or more implementations. For example, the integrity code may be retrieved from the database using the first identifier, the second identifier, and/or other information. It will be appreciated that operation 414 may be performed by an account subsystem that is the same as or similar to account subsystem 308, in accordance with one or more implementations.

At operation 416, a determination of whether the integrity code is valid and whether the second account is active may be effectuated by account subsystem 308, in accordance with one or more implementations. It will be appreciated that operation 416 may be performed by an account subsystem that is the same as or similar to account subsystem 308, in accordance with one or more implementations. Responsive to a determination that the integrity code is valid and that the second account is active, process 400 may proceed to operation 418.

At operation 418, a token may be generated by access token generation subsystem 310 based on a password associated with the second account (e.g., the password, the hash of the password, etc.) such that the token is usable by the first account to access the one or more postal services of the second account, in accordance with one or more implementations. As noted, the password may include letters, numbers, spaces, or special characters. Thus, in some implementations, the password may include passcodes, pass phrases, secret words, or other passwords. It will be appreciated that operation 418 may be performed by an access token generation subsystem that is the same as or similar to access token generation subsystem 310, in accordance with one or more implementations.

Figure 5:
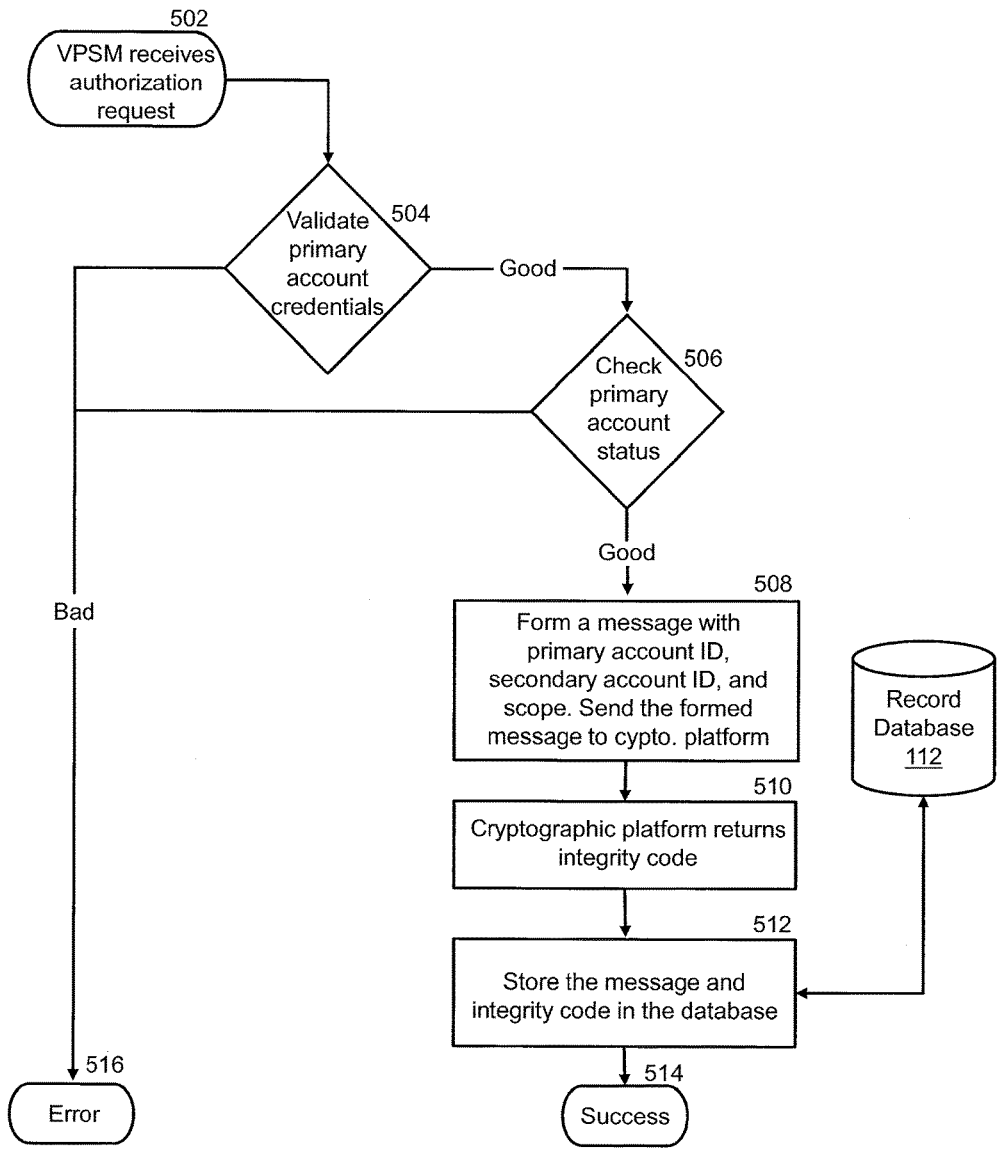
FIG. 5 illustrates a flowchart of a process for linking of a secondary account to a primary account, in accordance with one or more implementations.

FIG. 5 illustrates a flowchart of process 500 for linking of a secondary account to a primary account, in accordance with one or more implementations. The operations of process 500 presented below are intended to be illustrative. In some implementations, process 500 may be accomplished with one or more additional operations not described, and/or without one or more of the operations discussed. Additionally, the order in which the operations of process 500 are illustrated in FIG. 5 and described below is not intended to be limiting.

In certain implementations, process 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 500 in response to instructions stored electronically on an electronic storage medium. The one or more processing devices may include one or more devices configured through hardware, firmware, and/or software to be specifically designed for execution of one or more of the operations of process 500.

As shown, at operation 502, the VPSM platform 102 may receive a request to authorize access for a secondary account to one or more postal services of a primary account. The authorization request may indicate primary account information (e.g., the primary account identifier, username, password, etc.), secondary account information (e.g., the second account identifier), a scope of the access for the secondary account, and/or other information.

At operation 504, the VPSM platform 102 may determine whether the primary account credentials are valid. At operation 506, in response to a determination that the primary account credentials are valid, the primary account status may be checked. For example, the VPSM platform 102 may determine whether the primary account has permission to grant secondary access to the postal services of the primary account.

If, for instance, the primary account passes the status check, then, at operation 508, the VPSM platform 102 may form a message with the primary account identifier, the secondary account identifier, and information indicating the scope of the access. The message may then be provided to the cryptographic platform 110 to obtain an integrity code associated with the primary account and the secondary account.

At operation 510, the cryptographic platform 110 may return the integrity code to the VPSM platform 102 in response to the VPSM platform 102 providing the message. At operation 512, the VPSM platform 102 may store the message and the integrity code in the record database 112 as a signed authorization record. As discussed, in some implementations, the signed authorization record may indicate the primary account identifier, the secondary account identifier, the scope of the access, the integrity code, and/or other information. In this way, the signed authorization record may subsequently be utilized to enable the secondary account to access the postal services of the primary account via the approaches described herein.

Subsequently, at operation 514, a success indication may be returned. If, however, a failure or other error occurs during any of the operations described above, then, at operation 516, an error indication may be returned.

Figure 6:
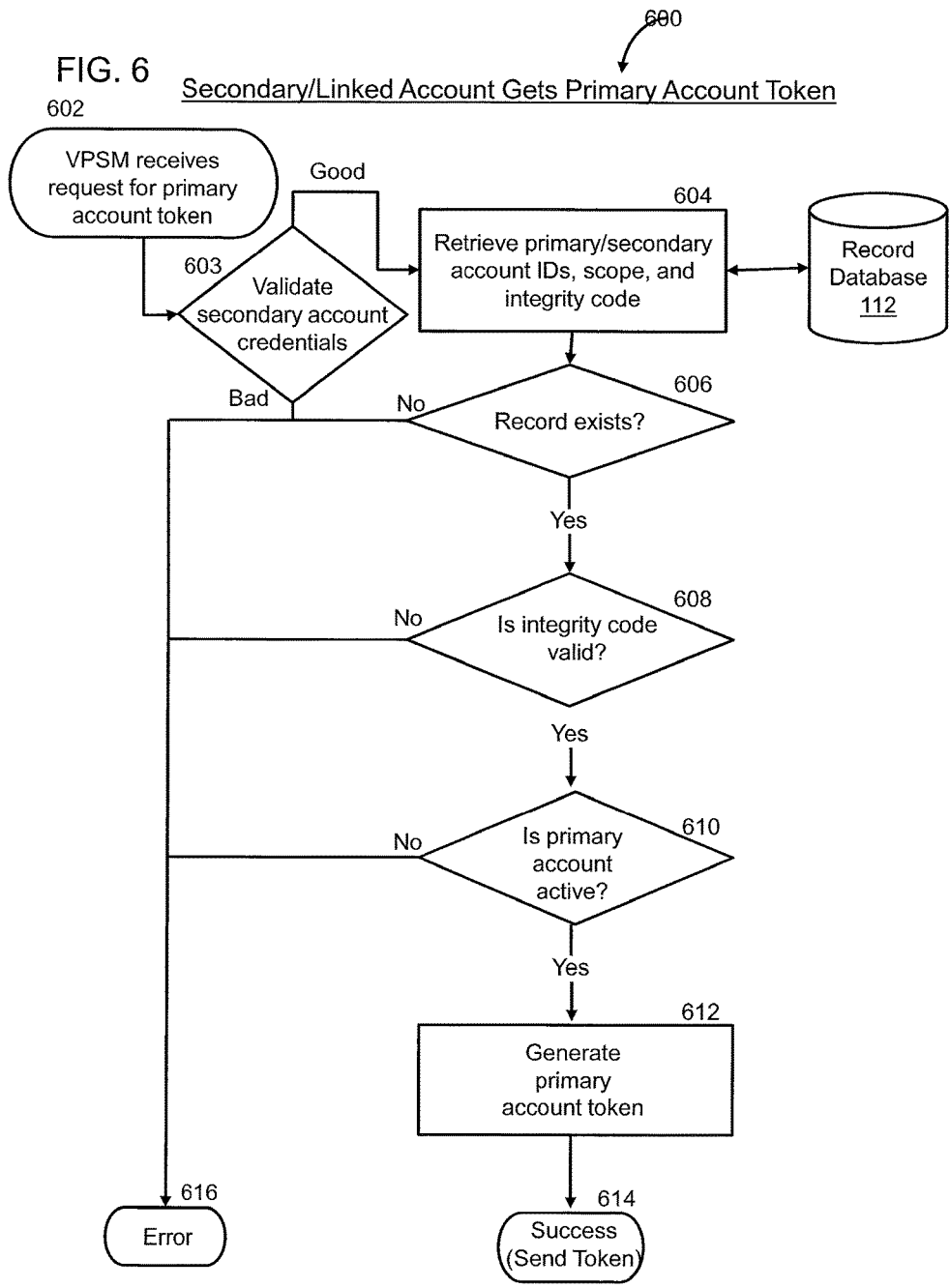
FIG. 6 illustrates a flowchart of a process for obtaining of a token usable by a secondary account to access a primary account, in accordance with one or more implementations.

FIG. 6 illustrates a flowchart of process 600 for obtaining of a token usable by a secondary account to access a primary account, in accordance with one or more implementations. The operations of process 600 presented below are intended to be illustrative. In some implementations, process 600 may be accomplished with one or more additional operations not described, and/or without one or more of the operations discussed. Additionally, the order in which the operations of process 600 are illustrated in FIG. 6 and described below is not intended to be limiting.

In certain implementations, process 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 600 in response to instructions stored electronically on an electronic storage medium. The one or more processing devices may include one or more devices configured through hardware, firmware, and/or software to be specifically designed for execution of one or more of the operations of process 600.

As shown, at operation 602, the VPSM platform 102 may receive a request for a primary account token that is usable by a secondary account to access postal services of the primary account. At operation 603, the VPSM platform 102 may attempt to validate the secondary account credentials. At operations 604 and 606, responsive to the secondary account credentials being valid, the VPSM platform 102 may attempt to retrieve a signed authorization record using the primary account identifier and/or the secondary account identifier. The signed authorization record may, for instance, indicate the primary account identifier, the secondary account identifier, a scope of the access for the secondary account, and an integrity code.

If, for instance, the signed authorization record exists, the VPSM platform 102 may check at operations 608 and 610 to see whether the integrity code is valid and whether the primary account is active. If the integrity code is valid and the primary account is active, then, at operation 612, the VPSM platform 102 may generate the primary account token. At operation 614, the primary account token may be sent to an application (e.g., application 106a) from which a user of the secondary account is logged in. In this way, the application may enable the user of the secondary account to access the postal services of the primary account using the token (e.g., the token may be used to generate postage indicia using the primary account's postage meter).

Moreover, at operation 614, a success indication may be returned. If, however, a failure or other error occurs during any of the operations described above, then, at operation 616, an error indication may be returned.

Figure 7:
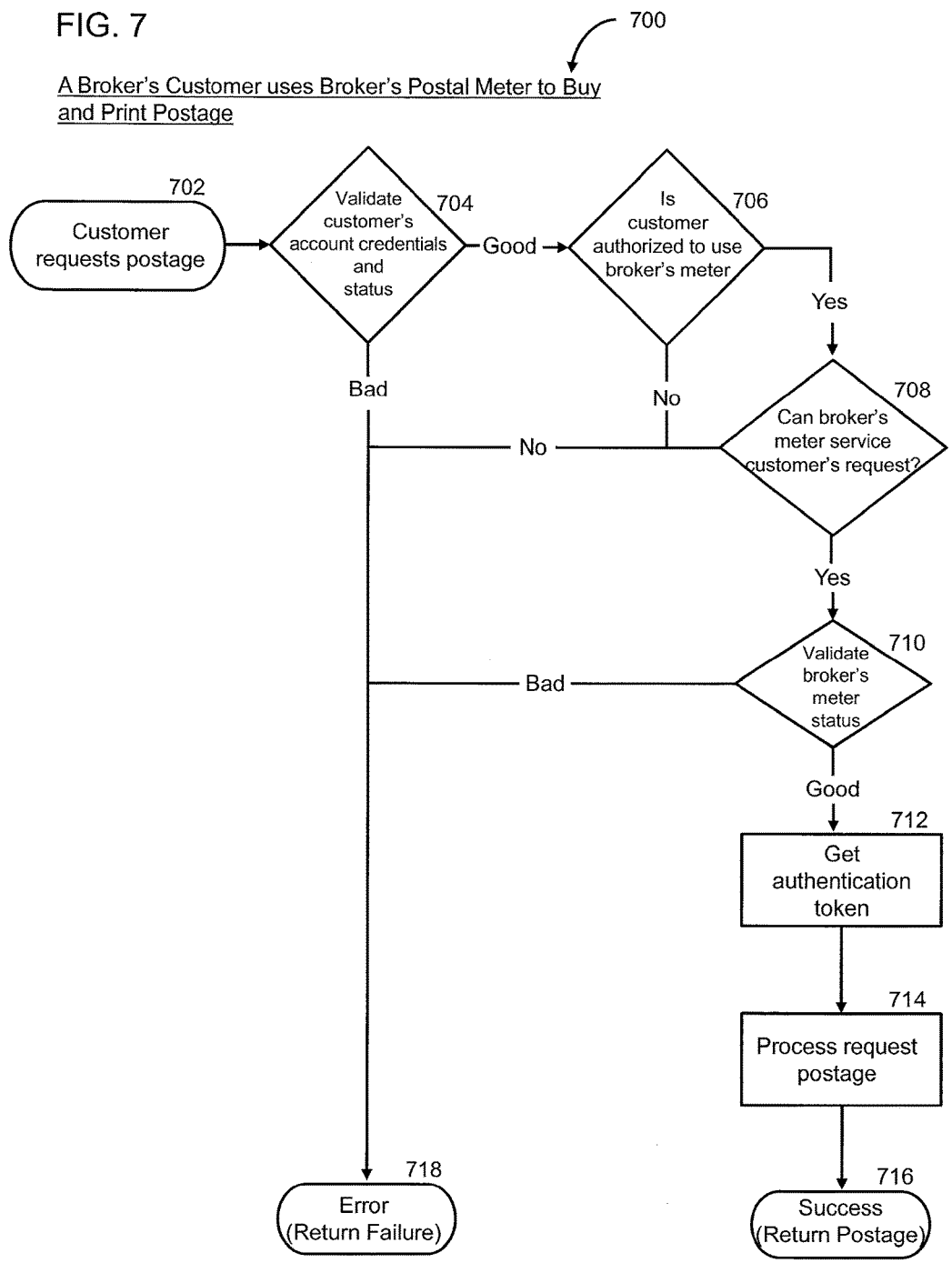
FIG. 7 illustrates a flowchart of a process for use of a broker's postage meter by the broker's customer, in accordance with one or more implementations.

FIG. 7 illustrates a flowchart of process 700 for use of a broker's postage meter by the broker's customer, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 7 and described below is not intended to be limiting.

In certain implementations, process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

Regarding the scenario in FIG. 7, a broker may any individual, organization, or other entity under a contractual agreement with one or more postal carriers, such as USPS, Canada Post, La Poste, etc. A broker may, for instance, offer its customers discounted postal rates. The broker may have an account that implements a valid, secured, and authorized virtual USPS postage meter to execute its transactions. In this scenario, a customer of the broker may also have an account that implements a valid virtual USPS postage meter. Nevertheless, the customer may execute a postal transaction using the broker's postage meter as opposed to the customer's own postage meter.

As shown, at operation 702, a customer may request postage from a broker. At operation 704, the customer's account credentials and status may be checked. At operation 706, a determination of whether the customer is authorized to use the broker's postage meter may be effectuated.

If, for instance, the customer is authorized to use the broker's postage meter, then, at operations 708 and 710, the broker's postage meter is checked to determine whether the broker's postage meter can service the customer's request and whether the broker's postage meter status is valid. If the broker's postage meter can service the customer's request and the broker's postage meter status is valid, and assuming that the customer's account is properly linked to the broker's account (e.g., there is a valid signed authentication code in the record database 112), an authentication token may be obtained at operation 712.

At operation 714, the authentication token may be utilized to authenticate the processing of the requested postage. At operation 716, a success indication may be returned. If, however, a failure or other error occurs during any of the operations described above, then, at operation 718, an error indication may be returned.

FIG. 8 illustrates a flowchart of process 800 for using a postal carrier account to print postage of other carriers, in accordance with one or more implementations. The operations of process 800 presented below are intended to be illustrative. In some implementations, process 800 may be accomplished with one or more additional operations not described, and/or without one or more of the operations discussed. Additionally, the order in which the operations of process 800 are illustrated in FIG. 8 and described below is not intended to be limiting.

In certain implementations, process 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 800 in response to instructions stored electronically on an electronic storage medium. The one or more processing devices may include one or more devices configured through hardware, firmware, and/or software to be specifically designed for execution of one or more of the operations of process 800.

Regarding the scenario in FIG. 8, the approaches described herein may also enable the flexibility to select the account providing the best service according to some criteria by choosing the best postal carriers, brokers, resellers, consolidators, partners, etc., according to some criteria such as price or speed of delivery so long as these accounts are linked.

In this scenario, a customer may have a valid, secured, and authorized postage meter (e.g., using his USPS account) to execute the customer's transactions. The customer may also be associated with multiple brokers, resellers, consolidators, partners, etc., that have accounts with multiple postal carriers (e.g., USPS, Canada Post, La Poste, etc.). As shown, at operation 802, the customer may use his USPS account to initiate a request for postage. At operation 804, a determination of whether the customer's USPS account credentials and status are valid may be effectuated. If, for instance, the customer's USPS account credentials and status are valid, then, at operation 806, the postal carriers that the customer is authorized to use (e.g., via broker, reseller, consolidator, or partner postage meters to which the customer's USPS account is linked) may be determined. At operation 808, in response to determining those postal carriers, an application that the customer used to log into his USPS account may be used to rate shop across those determined postal carriers to select the broker, reseller, consolidator, or partner having a postage meter of the postal carrier offering the best rate for the requested postage.

At operations 810 and 812, a selected postage meter (e.g., the postage meter of the postal carrier offering the best rate) is checked to determine whether the selected postage meter can service the customer's request and whether the selected postage meter's status is valid. If the selected postage meter can service the customer's request and the selected postage meter's status is valid, an authentication token may be obtained at operation 814.

If it is determined that the selected postage meter cannot service the customer's request or the selected postage meter's status is not valid, or if the authentication token cannot be obtained, then, at operation 816, another postage meter of a carrier with the next best rate may be selected, and operations 810, 812, and 814 may be performed for that selected postage meter.

Otherwise, at operation 818, the authentication token may be utilized to authenticate the processing of the requested postage. At operation 820, a success indication may be returned. If, however, a failure or other error occurs during other operations described above, then, at operation 822, an error indication may be returned.

FIG. 9 illustrates another flowchart of process 900 for using a postal carrier account to print postage of other carriers, in accordance with one or more implementations. The operations of process 900 presented below are intended to be illustrative. In some implementations, process 900 may be accomplished with one or more additional operations not described, and/or without one or more of the operations discussed. Additionally, the order in which the operations of process 900 are illustrated in FIG. 9 and described below is not intended to be limiting.

In certain implementations, process 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 900 in response to instructions stored electronically on an electronic storage medium. The one or more processing devices may include one or more devices configured through hardware, firmware, and/or software to be specifically designed for execution of one or more of the operations of process 900.

Regarding the scenario in FIG. 9, a customer may have a valid USPS postage meter along with postage meters with other postal carriers. In this scenario, the customer may print postage of another postal carrier using the customer's USPS account associated with the USPS postage meter.

As shown, at operation 902, the customer may his USPS account to initiate a request for postage of the other postal carrier. For example, the customer may initiate the request to his USPS postage meter that will delegate the request to a postage meter of the other postal carrier that the USPS postage meter is authorized to access. At operation 904, a determination of whether the customer's USPS account credentials and status are valid may be effectuated. If, for instance, the customer's USPS account credentials and status are valid, then, at operation 906, a determination of whether the customer is authorize to use the postage meter of the other postal carrier may then be effectuated.

If, for instance, the customer is authorized to use the postage meter of the other postal carrier, then, at operations 908 and 910, the postage meter of the other postal carrier is checked to determine whether the postage meter of the other postal carrier can service the customer's request and whether the status of the postage meter of the other postal carrier is valid. If the postage meter of the other postal carrier can service the customer's request and the status of the postage meter of the other postal carrier is valid, an authentication token may be obtained at operation 912.

At operation 914, the authentication token may be utilized to authenticate the processing of the requested postage. At operation 916, a success indication may be returned. If, however, a failure or other error occurs during any of the operations described above, then, at operation 918, an error indication may be returned.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method for facilitating access of postal services of an account by another account, the method being implemented on a computer system that includes one or more physical processors executing one or more computer program instructions which, when executed, perform the method, the method comprising:
   receiving, by the one or more physical processors, a request to authorize access for a first account of a postal carrier to one or more postal services of a second account of a postal carrier;
   responsive to authorization from the second account, combining, by the one or more physical processors, a first identifier associated with the first account and a second identifier associated with the second account to generate a message such that the message comprises the first identifier and the second identifier;
   responsive to the message being provided to a cryptographic platform, receiving, by the one or more physical processors, an integrity code associated with the first account and the second account from the cryptographic platform, the integrity code being configured to enable the access to the one or more postal services of the second account for the first account;
   storing, by the one or more physical processors, the integrity code in association with the first account;
   receiving, by the one or more physical processors, a request initiated via the first account to execute a postal transaction associated with the one or more postal services of the second account;
   responsive to the first-account-initiated request, using, by the one or more physical processors, the first identifier and/or the second identifier to retrieve the integrity code stored in association with the first account;
   using, by the one or more physical processors, the retrieved integrity code to validate the first-account-initiated request; and
   responsive to the validation indicating that the first-account-initiated request is valid, initiating, by the one or more physical processors, execution of the postal transaction associated with the one or more postal services of the second account.

2. The method of claim 1, further comprising:
   combining, by the one or more physical processors, the integrity code, the first identifier, and the second identifier to generate an authentication token such that the authentication token comprises the integrity code, the first identifier, and the second identifier; and
   providing, by the one or more physical processors, the authentication token to a user device, the authentication code being stored in an applicable cache at the user device for use by the user device to use the first account to access the one or more postal services of the second account.

3. The method of claim 1, wherein the one or more postal services of the second account comprises a postage meter associated with the second account for purchasing postage indicia of a government agency, and
   wherein the postal transaction comprises a transaction to purchase one or more postage indicia and/or a transaction to generate the one or more postage indicia.

4. The method of claim 1, wherein the one or more postal services of the second account comprises a service for purchasing and/or generating postage indicia at a second rate that is different from a first rate for purchasing and/or generating the postage indicia.

5. The method of claim 1, wherein storing the integrity code comprises storing the integrity code and the message in a database as at least part of a signed authorization record in association with the first account,
   wherein retrieving the integrity code comprises using the first identifier and/or the second identifier to retrieve the signed authorization record from the database responsive to the first-account-initiated request,
   the method further comprising:
      combining, by the one or more physical processors, the integrity code and the message from the signed authorization record to generate an authentication token such that the authentication token comprises the integrity code and the message; and
      providing, by the one or more physical processors, the authentication token to a user device for use by the user device to use the first account to access the one or more postal services of the second account.

6. The method of claim 5, wherein providing the authentication token to the user device comprises providing an encrypted version of the authentication token to the user device.

7. The method of claim 5, wherein generating the authentication token comprises using the integrity code, the message, and a password associated with the second account to generate the authentication token, the password comprising one or more letters, numbers, spaces, or special characters.

8. The method of claim 7, wherein the authentication token is generated at a first time, and the password associated with the second account is modified at a second time subsequent the first time, the method further comprising:
   determining, by the one or more physical processors, an attempt to use the authentication token to access the one or more postal services of the second account subsequent the modification of the password; and
   determining, by the one or more physical processors, that the authentication token is an invalid token in response to the access attempt, the authentication token being invalid as a result of the modification of the password associated with the second account.

9. The method of claim 1, wherein the first account comprises a first primary account of a postal carrier for accessing one or more postal services, the second account comprises a second primary account of a postal carrier for accessing one or more postal services, and the one or more postal services of the second account comprises one or more postal services accessible via the second primary account, the first account acting as a secondary account to the second primary account upon the authorization from the second account.

10. The method of claim 9, wherein the first primary account is a primary account of a first postal carrier for accessing one or more postal services of the first postal carrier, and the second primary account is another primary account of the first postal carrier for accessing one or more postal services of the first postal carrier.

11. The method of claim 9, wherein the first primary account is a primary account of a first postal carrier for accessing one or more postal services of the first postal carrier, and the second primary account is a primary account of a second postal carrier, different from the first postal carrier, for accessing one or more postal services of the second postal carrier.

12. The method of claim 1, wherein the execution of the postal transaction is initiated without specific approval from a user of the second account for the postal transaction.

13. A system for facilitating access of postal services of an account by another account, the system comprising:
one or more physical processors programmed with one or more computer program instructions which, when executed, cause the system to:
receive a request to authorize access for a first account of a postal carrier to one or more postal services of a second account of a postal carrier;
responsive to authorization from the second account, combine a first identifier associated with the first account and a second identifier associated with the second account to generate a message such that the message comprises the first identifier and the second identifier;
responsive to the message being provided to a cryptographic platform, receive an integrity code associated with the first account and the second account from the cryptographic platform, the integrity code being configured to enable the access to the one or more postal services of the second account for the first account;
store the integrity code in association with the first account;
receive a request initiated via the first account to execute a postal transaction associated with the one or more postal services of the second account;
responsive to the first-account-initiated request, use the first identifier and/or the second identifier to retrieve the integrity code stored in association with the first account;
use the retrieved integrity code to validate the first-account-initiated request; and
responsive to the validation indicating that the first-account-initiated request is valid, initiate execution of the postal transaction associated with the one or more postal services of the second account.

14. The system of claim 13, wherein the system is caused to:
combine the integrity code, the first identifier, and the second identifier to generate an authentication token such that the authentication token comprises the integrity code, the first identifier, and the second identifier; and
provide the authentication token to a user device, the authentication code being stored in an applicable cache at the user device for use by the user device to use the first account to access the one or more postal services of the second account.

15. The system of claim 13, wherein the one or more postal services of the second account comprises a postage meter associated with the second account through which postage indicia is purchasable, and wherein the postal transaction comprises a transaction to purchase one or more postage indicia and/or a transaction to generate the one or more postage indicia.

16. The system of claim 13, wherein the first account comprises a first primary account of a postal carrier for accessing one or more postal services, the second account comprises a second primary account of a postal carrier for accessing one or more postal services, and the one or more postal services of the second account comprises one or more postal services accessible via the second primary account, the first account acting as a secondary account to the second primary account upon the authorization from the second account.

17. The system of claim 16, wherein the first primary account is a primary account of a first postal carrier for accessing one or more postal services of the first postal carrier, and the second primary account is another primary account of the first postal carrier for accessing one or more postal services of the first postal carrier.

18. The system of claim 16, wherein the first primary account is a primary account of a first postal carrier for accessing one or more postal services of the first postal carrier, and the second primary account is a primary account of a second postal carrier, different from the first postal carrier, for accessing one or more postal services of the second postal carrier.

19. The system of claim 13, wherein the execution of the postal transaction is initiated without specific approval from a user of the second account for the postal transaction.

* * * * *